Patented May 25, 1937

2,081,266

UNITED STATES PATENT OFFICE 2,081,266

CONDENSATION PRODUCT OF CASTOR OIL WITH HALF ESTER OF MALEIC ACID

Herman A. Bruson, Germantown, Pa., assignor to The Resinous Products & Chemical Co. Inc., Philadelphia, Pa.

No Drawing. Application May 10, 1932, Serial No. 610,504

28 Claims. (Cl. 260—2)

This invention describes a method of preparing new and useful rubber-like or sirupy materials, by heating castor oil with a half ester of maleic acid such as is obtained by esterifying only one carboxyl group of maleic acid or of maleic anhydride with a monohydric alcohol.

One object of this invention is to provide an elastic sirupy material which is readily soluble in lacquer solvents such as esters, ketones, and hydrocarbons that are commonly used in nitrocellulose lacquer compositions; and which may thus be mixed in any proportion with nitrocellulose with or without other resins to form lacquers which give clear, homogeneous, elastic films that adhere well to metal or wood surfaces.

Still a further object is to produce a non-spewing derivative of castor oil for use as a nitrocellulose plasticizer in coatings for fabrics, artificial leather, natural leather, paper, linoleum, rubberized fabric, regenerated cellulose, and the like.

Another object is to provide a plastic rubber-like derivative of castor oil which, in the presence of siccatives possesses drying properties somewhat like linseed oil, and which may be mixed directly with oleo-resinous varnishes as an adjunct to or in lieu of the commonly used drying oils, in order to obtain non-yellowing coating compositions of extreme flexibility.

It has been known for some time that maleic acid as well as other polycarboxylic acids may be condensed with polyhydric alcohols such as glycerol or glycols to form so-called alkyd resins and that such condensations can be carried out in the presence of castor oil with or without the use of other fatty oils, alcohols, fatty acids, resins, etc., to yield resinous bodies which may be used in nitrocellulose lacquers. (U. S. Patents 1,690,515; 1,098,728; 1,141,944; 1,785,930; 1,799,-420; 1,783,167; 1,807,503.) Such prior processes involve the use in every case of polyhydric alcohols so as to produce with the polybasic acid, a fundamental resin complex which is modified by and dispersed in the castor oil. Depending upon the kind of polybasic acid used as well as upon the nature of the polyhydric alcohol, a given quantity of castor oil will yield entirely different resins. In general the aromatic polycarboxylic acids with polyhydric alcohols and castor oil yield either hard, tough resins or sticky sirups which upon ageing in the form of films or coatings become progressively more and more brittle. The aliphatic polycarboxylic acids having long chains over 6 carbons such as sebacic acid, yield soft, tough, rubber-like masses or oily sirups which do not become brittle upon ageing. However, all of these products possess certain limitations. They are for example incompatible with certain hard, natural and synthetic resins such as modified ester-gums and phenol-formaldehyde-rosin esters which are used in large quantities in nitrocellulose lacquers. They furthermore are generally incompatible when mixed in cold with oleo-resinous paints or varnishes and require for their solutions aromatic hydrocarbons such as toluene or xylene rather than the commonly used cheap varnish thinners of aliphatic nature such as petroleum naphtha. These limitations are completely absent in the products made according to the present invention as described in more detail below.

It has furthermore been proposed to heat castor oil with maleic acid (or maleic anhydride) alone, to obtain completely insoluble rubbery masses, (German Patent 479,965 (1929)) which can be made soluble in oils or resins only by heating with the latter during the condensation and which likewise then yield completely insoluble linoxyn-like materials. On account of their insolubility such materials cannot be used in lacquers or varnishes.

According to the present invention however, products are obtained which are totally different from any of the above types. They are first of all not made from any polyhydric alcohols whatsoever. They are furthermore exceedingly soluble in most organic solvents including petroleum naphtha, and are compatible with practically all of the hard, natural or synthetic resins at present available which are themselves compatible with nitrocellulose solutions. In addition these new products are readily soluble in and compatible with odrinary or bodied drying oils, and with paints and oleo-resinous varnishes prepared from drying oils. They embrittle only very slightly on ageing in the form of films or coatings and can be baked to give hard, tough elastic films. They thus have a wide sphere of usefulness in preparing coatings of the most diverse nature.

In practicing this invention, castor oil (raw, air-blown, or heat-bodied) is heated with a half ester of maleic acid such as is obtained by condensing one mole of a monohydric alcohol with maleic anhydride or maleic acid. Such half esters are usually crystalline substances, soluble in sodium carbonate solution. The condensation is effected at a temperature preferably between 150° C. and 250° C. usually 200° C. in a vessel equipped with an agitator and an outlet for the water vapor formed. The proportion of castor oil to maleic half ester may vary within wide limits. Workable proportions which give good results are as follows:

1 mole castor oil + 1 mole maleic half ester
1 mole castor oil + 1.5 moles maleic half ester
1 mole castor oil + 2 moles maleic half ester
1 mole castor oil + 2.5 moles maleic half ester
1 mole castor oil + 3 moles maleic half ester In most cases it is not necessary to isolate the half ester of maleic acid for use in this condensation, as the same result may be obtained by heating castor oil with maleic acid or maleic anhydride and a monohydric alcohol, the maleic half ester being formed in situ during the heating and ultimately condensing further with the castor oil.

The monohydric alcohols preferably used are those boiling above 150° C. such as cyclohexanol, octyl alcohol, hexyl alcohol, capryl alcohol, benzyl alcohol, borneol, fenchol, alpha-terpineol, glycol monobutyl ether 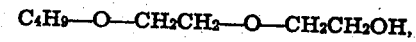, diethylene glycol-monobutyl ether

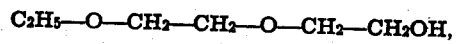

diethylene glycol-monoethyl ether $C_2H_5-O-CH_2-CH_2-O-CH_2-CH_2OH$, oelic alcohol, cetyl alcohol, octadecanol, and the mixed higher alcohols of boiling range 190°–250° C. which are obtained as a by-product in the manufacture of synthetic methanol from hydrogen and carbon monoxide and consisting essentially of aliphatic methyl- and dimethyl-derivatives of primary and secondary alcohols higher than heptyl alcohol.

The products obtained vary in their film characteristics somewhat from each other, depending upon the particular alcohol used and the ratio of the castor oil to the maleic half ester. They are all extremely viscous rubbery sirups which dissolve in benzene, toluene, acetone, butyl acetate, petroleum naphtha and linseed oil. They are heat reactive and if heated for a considerable period of time (3-4 hours at 100° C.) lose their solubility in organic solvents and form tough, soft, plastic masses having adhesive properties. Those made from half esters of maleic acid with terpenic alcohols show unusual drying properties in the presence of siccatives such as cobalt resinate. Such compositions dry in 24 hours to pale flexible films which discolor only slightly on ageing. This behavior was entirely unexpected as castor oil or heat-bodied castor oils are non-drying oils under the same conditions.

In their soluble form these plastic materials may be heated with waxes to produce petrolatum-like substances having useful properties in printing inks and in coatings for finishing textiles. Their properties may be modified by heating with fatty oils such as sardine oil, olive oil, cotton seed oil, rape seed oil, linseed oil, tung oil, soya bean oil and the like, for special purposes. All of these combinations when incorporated in nitrocellulose lacquers give non-spewing films characterized by extreme softness and flexibility and free from the rancid odor of castor oil. They may likewise be heated or mixed with other natural or synthetic resins such as ester gum, rosin, dammar, fossil gums, or alkyd resin to flexibilize the same.

In the following examples, typical methods for making these resins are given:

*Example 1*

310 grams raw castor oil is mixed with 152 grams of mono-octylmaleate (obtained by condensing maleic anhydride with one mole equivalent of octyl alcohol) and the mixture heated in an open vessel with stirring at 190–200° C. At first a thin liquid forms but as heating continues, it becomes increasingly more viscous and sticky until after about 3 hours a very heavy, pale rubbery liquid is obtained. This may be dissolved in toluene or butyl acetate to give an 80% solution of the material. It is readily compatible with solutions of nitrocellulose and in the proportions of 1 part nitrocellulose (dry) to 2 parts of the material gives elastic tough films having good physical properties.

*Example 2*

373 grams castor oil (air-blown) is mixed with 83 grams maleic anhydride and 140 grams of the monobutylether of diethylene glycol. Heated to 110° C. under reflux condenser for about 6 hours then gradually to 210° C. without reflux for about 2 hours until a soft rubbery mass soluble in toluene was formed.

*Example 3*

373 grams raw castor oil was heated under a reflux condenser with a mixture of 93 grams maleic acid and 62 grams commercial alpha-terpineol at 180–190° C. for about 1 hour and then without reflux for about 2 hours until a viscous material having a viscosity "J" (Gardner-Holt scale) when cut 50% with toluene was obtained. The product was mixed with 1% of its weight of cobalt resinate drier dissolved in a little petroleum naphtha. It behaves like a drying oil when exposed to the air. The product may be blended directly with drying oils or oleo-resinous varnishes to produce toughened films which when baked at 300 to 400° F. form insoluble coatings. For example a varnish made from 100 pounds of a natural or synthetic resin and 20 gallons of drying oil may be mixed with 100 pounds of the above plastic material to produce a varnish which when mixed with cobalt resinate siccative dries tack free within 24 hours.

*Example 4*

373 grams heat bodied castor oil is heated with a mixture of 46 grams maleic acid, 47 grams cetyl alcohol and 25 grams Japan wax to 190–195° C. for 9 hours until a soft rubbery mass soluble in benzene is formed.

*Example 5*

310 grams raw castor oil, 133 grams monohexyl maleate, and 85 grams sardine oil (or any drying oil such as linseed oil) are heated together in an open vessel in an atmosphere of carbon dioxide at 200° C. for about 5 hours until a rubbery, benzene-soluble product is formed.

*Example 6*

310 grams raw castor oil, 100 grams maleic anhydride and 100 grams cyclohexanol are heated together for about 1 hour at 110° C. then gradually during 2 hours to 150° C. in an open vessel. The temperature is then raised to 205° C. and held thereat for about 3 hours until a viscous rubbery substance soluble in toluene is obtained.

*Example 7*

373 grams raw castor oil, 93 grams maleic acid and 146.4 grams of higher alcohols (B. P. 190–250° C.) from the methanol synthesis were heated together at 190–200° C. in an open vessel for several hours until a benzene-soluble rubber-like mass was obtained.

In the above examples numerous modifications in the proportions and the nature of the ingredients may be made without departing from the scope of the invention which is limited only in the claims that follow. To anyone versed in the art it is evident that other temperatures can be employed and that wide variations are possible. Reduced pressures can be used with good results.

Mixtures of more than one maleic half ester may be used in the condensations. The use of an excess of monohydric alcohol over that theoretically necessary to combine with one maleic acid carboxyl group is also included herein as in this case neutral, non-harmful diesters of maleic acid are produced in admixtures with the plastic condensation product. The condensations may be carried out in the presence of inert high boiling solvents such as petroleum naphtha or amylbenzene; and rosin, ester gum, or other natural or artificial resins may be added to produce varnish-like materials. In addition to the oils, waxes, and resins, other compounds such as soaps, driers and pigments may be incorporated with the products obtainable as described herein.

What I claim is:

1. A composition of matter consisting of a condensation product of castor oil, an alcohol containing only one hydroxyl group, and a member of the group consisting of maleic acid and maleic anhydride.

2. A composition of matter consisting of a condensation product of castor oil with a maleic acid half ester of an alcohol containing only one hydroxyl group.

3. A composition of matter consisting of a condensation product of castor oil, maleic acid, an alcohol containing only one hydroxyl group and one of the group consisting of fatty oils and waxes.

4. A composition of matter consisting of a condensation product of castor oil, alpha-terpineol, and maleic acid.

5. A composition of matter consisting of a condensation product of castor oil, monobutylether of diethylene glycol, and maleic acid.

6. A composition of matter consisting of a condensation product of castor oil, an alcohol containing only one hydroxyl group boiling above 150° C. and a member of the group consisting of maleic acid and maleic anhydride.

7. A composition of matter consisting of a condensation product of castor oil, maleic acid, and an octyl alcohol.

8. A process which comprises heating at reaction temperature, a mixture of castor oil, an alcohol containing only one hydroxyl group, and a member of the group consisting of maleic acid and maleic anhydride.

9. A process which comprises heating at reaction temperature, a mixture of castor oil and a maleic acid half ester of an alcohol containing only one hydroxyl group.

10. A process which comprises heating at reaction temperature, a mixture of castor oil, maleic acid, an alcohol containing only one hydroxyl group, and a wax.

11. A process which comprises heating at reaction temperature, a mixture of castor oil, maleic acid, an alcohol containing only one hydroxyl group, and a fatty oil.

12. A process which comprises heating at about 150–230° C. a mixture of castor oil, an alcohol containing only one hydroxyl group boiling above 150° C. and a member of the group consisting of maleic acid and maleic anhydride.

13. A process which comprises heating at about 150–250° C. a mixture of castor oil and a half ester of maleic acid and an alcohol containing only one hydroxyl group, said alcohol boiling above 150° C.

14. The process which comprises heating at reaction temperature a mixture of castor oil, alpha-terpineol, and maleic acid.

15. The process which comprises heating at reaction temperature a mixture of castor oil, the monobutylether of diethylene glycol, and maleic acid.

16. The process for preparing a resin which comprises heating at reaction temperature a castor oil, an octyl alcohol, and maleic acid.

17. The process which comprises heating at reaction temperature a mixture of castor oil, a maleic acid half ester of an alcohol containing only one hydroxyl group, and a wax.

18. The process for preparing a resin which comprises heating at reaction temperature, a mixture of castor oil, a maleic acid half ester of an alcohol containing only one hydroxyl group, and a fatty oil.

19. A process which consists in (1) heating an alcohol containing only one hydroxyl group with maleic anhydride so as to form a maleic acid half ester and (2) subsequently, condensing said half ester with castor oil, so as to obtain a product soluble in hydrocarbons.

20. A process which consists in (1) heating maleic anhydride with a glycol ether containing only one free hydroxyl group so as to form a maleic acid half ester and (2) subsequently, condensing said half ester with castor oil and a member of the group consisting of fatty oil glycerides and waxes.

21. A composition of matter consisting of a condensation product of castor oil and a mono ester obtained from maleic acid and a saturated monohydric alcohol.

22. A condensation product of castor oil, a member of the group consisting of maleic acid and its anhydride and a monohydric alcohol of the general formula—R—OH—in which R represents a member of the group consisting of aliphatic and alicyclic hydrocarbon radicals and glycol ether groups.

23. A condensation product and castor oil, a member of the group consisting of maleic acid and maleic anhydride, and an aliphatic alcohol containing only one hydroxyl group.

24. A condensation product of castor oil, a member of the group consisting of maleic acid and maleic anhydride, and a monohydric terpene alcohol.

25. A condensation product of castor oil and a mono ester obtained from maleic acid and an aliphatic alcohol containing only one hydroxyl group.

26. A condensation product of castor oil and the reaction product of maleic anhydride and a monohydric terpene alcohol.

27. A condensation product obtained by the joint condensation of castor oil, maleic acid or its anhydride, and an aliphatic or alicyclic alcohol containing only one hydroxyl group.

28. A condensation product obtained by the joint condensation of castor oil, maleic acid or its anhydride, and a monohydric terpene alcohol.

HERMAN A. BRUSON.

CERTIFICATE OF CORRECTION.

Patent No. 2,081,266.  May 25, 1937.

HERMAN A. BRUSON.

It is hereby certified that error appears in the printed specification of the above numbered patent requiring correction as follows: Page 2, first column, line 27, for "oelic" read oleic; page 3, second column, line 51, claim 23, for "and" read of; and that the said Letters Patent should be read with these corrections therein that the same may conform to the record of the case in the Patent Office.

Signed and sealed this 31st day of August, A. D. 1937.

Leslie Frazer (Seal)  Acting Commissioner of Patents.